United States Patent [19]

Osawa et al.

[11] Patent Number: 4,633,145
[45] Date of Patent: Dec. 30, 1986

[54] BRIGHTNESS CONTROL CIRCUIT FOR DISPLAY APPARATUS WITH COLOR PICTURE TUBE

[75] Inventors: Michitaka Osawa; Yuichiro Kimura; Hiroyuki Miyajima, all of Yokohama, Japan

[73] Assignee: Hitachi, Ltd., Tokyo, Japan

[21] Appl. No.: 614,681

[22] Filed: May 29, 1984

[30] Foreign Application Priority Data

May 27, 1983 [JP] Japan .................. 58-92301

[51] Int. Cl.$^4$ ............ H01J 29/52; H04N 9/64; H04N 5/235
[52] U.S. Cl. .................... 315/383; 358/29; 358/34; 358/168; 358/219
[58] Field of Search ............ 315/383; 358/29, 34, 358/168, 173, 219, 65

[56] References Cited

U.S. PATENT DOCUMENTS

4,285,008  8/1981  Osawa et al. ............... 358/29

Primary Examiner—Theodore M. Blum
Assistant Examiner—Gregory C. Issing
Attorney, Agent, or Firm—Antonelli, Terry & Wands

[57] ABSTRACT

A brightness control circuit for a color display tube comprises voltage regulating means for varying a voltage between an input terminal and an output terminal thereof in dependence on an externally supplied voltage control signal are provided between cathodes of a color display tube corresponding to primary color signals and an output end of the color display tube drive circuit for supplying drive currents to the individual cathodes of the color display tube, and voltage control signal generating means connected to the voltage regulating means for supplying the voltage control or adjusting signals to the voltage regulating means. The voltage control signal generating means include two regulating means, i.e. first regulating means for changing simultaneously all the voltage control signals supplied to the voltage regulating means corresponding to the primary color signals and second regulating means for varying individually the voltage control signals for each of the color signals. Adjustment of cut-off voltage of the color display tube and adjustment of the white balance in the state of high brightness are performed by the second regulating means while the brightness of a raster scanned on the face plate is adjusted with the aid of the first regulating means.

17 Claims, 5 Drawing Figures

BRIGHTNESS CONTROL CIRCUIT FOR DISPLAY APPARATUS WITH COLOR PICTURE TUBE

BACKGROUND OF THE INVENTION

In general, a display apparatus equipped with a color display tube (color picture tube) is provided with a brightness or intensity control circuit for adjustably changing the brightness of a raster scanned on a face plate of the color display tube. Such a brightness control circuit has to be so designed that only the brightness of the raster produced through beam scanning on the face plate can be varied without bringing about any change in the color tone of the raster. Further, the brightness control circuit must be so arranged as to change only the brightness of the raster when the latter is at a low or high level.

Figure 1:
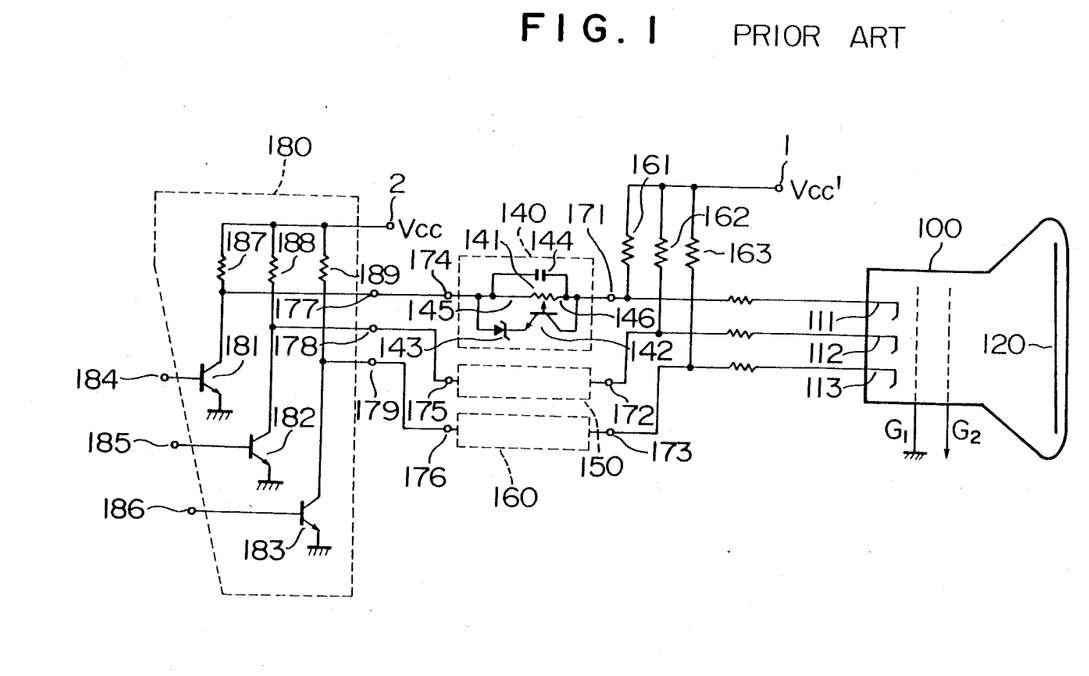
FIG. 1 is a circuit diagram of a hitherto known cut-off voltage regulating circuit.

Usually, the raster on the face plate of the color display tube is produced by scanning with three electron beams an array of triplets of phosphor dots for red, green and blue sequentially disposed on the face plate of the color display tube. The three electron beams are emitted by three cathode electrodes mounted within the color display tube. The brightness of the raster undergoes variation when the quantity of electron beams, i.e. the currents, is changed. These currents in turn vary when the voltages applied to the cathodes of the color display tube undergo variation. In other words, change in the voltages applied to the cathodes brings about a corresponding change or variation in the brightness of the raster. When the three cathode voltages are changed independent of one another, the amounts of light in red, green and blue produced by the phosphor dots also vary independent of one another. The result of this is that variations occur not only in the brightness of the raster but also in the color tone thereof. When the three cathode voltages are changed with the voltage ratios thereamong being selected at appropriate values, only the brightness can be changed without exerting influence on the color tone. The circuit for selecting the cathode voltages of the color display tube at appropriate values when the brightness of the raster is low is known as the cut-off voltage control or regulating circuit, a typical one of which is disclosed in Japanese Patent Application Laid-Open No. 138987/1980. In FIG. 1 of the accompanying drawings, there is shown this cut-off voltage control or regulating circuit. Referring to the Figure, a color display tube 100 includes three cathode electrodes 111, 112 and 113 which are connected to a power source terminal 1 ($V_{cc'}$) by way of resistors 161, 162 and 163, respectively. Further, the cathodes 111, 112 and 113 are, respectively, connected to cut-off voltage control or regulating circuits 140, 150, and 160 by way of terminals 171, 172 and 173. The other terminals 174, 175 and 176 of the cut-off voltage regulating circuits 140, 150 and 160 are connected to a color display tube drive circuit 180 through terminals 177, 178 and 179. The color display tube drive circuit 180 includes transistors 181, 182 and 183 having collectors connected to the terminals 177, 178 and 179, respectively. Bases of the transistors 181, 182 and 183 are, respectively, connected to terminals 184, 185 and 186 to which video signals are supplied. The video signals applied to the terminals 184, 185 and 186 are amplified by the transistors 181, 182 and 183 of the color display tube drive circuit 180 and supplied to the cathodes 111, 112 and 113 of the color display tube 100 from the terminals 177, 178 and 179 of the color display tube drive circuit 180 by way of the cut-off voltage control or regulating circuits 140, 150 and 160, respectively. Connected to the collectors of the transistors 181, 182 and 183 are resistors 187, 188 and 189 which in turn are connected to a power source terminal 2 ($V_{cc}$). The voltage $V_{cc}$ at the power source terminal 2 is set at a lower level than the voltage $V_{cc'}$ of the power source terminal 1. Unless the video signal is supplied to the input terminals 184, 185 and 186 of the color display tube drive circuit 180, the transistors 181, 182 and 183 remain in the cut-off state. Accordingly, a DC current flows from the power source terminal 1 to the power source terminal 2 through the resistors 161, 162 and 163, the cutoff voltage control or regulating circuits 140, 150 and 160 and the resistors 187, 188 and 189. The cut-off voltage control or regulating circuit 140 includes a variable resistor 141, a transistor 142, a constant-voltage diode (avalanche diode) 143 and a capacitor 144. The cut-off voltage control or regulating circuits 150 and 160 also are constituted by components similar to those of the cut-off voltage control or regulating circuit 140. The resistance values of the resistors 187, 188 and 189 are selected to be so small that voltages $E_{1R}$, $E_{1G}$ and $E_{1B}$ appearing at the terminals 174, 175 and 176 may be substantially equal to the voltage $V_{cc}$ of the power source terminal 2.

Therefore, the voltages $E_{2R}$, $E_{2G}$ and $E_{2B}$ at the terminals 171, 172 and 173 respectively are lower than the voltage $V_{cc'}$ at the power source terminal 1. Voltages $(E_{2R}-E_{1R})$, $(E_{2G}-E_{1G})$ and $(E_{2B}-E_{1B})$ appearing between the terminals 171, 172 and 173 and the terminals 174, 175 and 176 are, respectively, changed by the cut-off voltage control or regulating circuits 140, 150 and 160. By way of example, in the cut-off voltage control or regulating circuit 140, the voltage $(E_{2R}-E_{1R})$ is changed or regulated by means of the variable resistor 141. Functions of the cut-off voltage control circuits 140, 150 and 160 will be described hereinafter. Since the voltages $E_{1R}$, $E_{1G}$ and $E_{1B}$ are substantially equal to the voltage $V_{cc}$, the voltages $E_{2R}$, $E_{2G}$ and $E_{2B}$ will change when the voltages $(E_{2R}-E_{1R})$, $(E_{2G}-E_{1G})$ and $(E_{2B}-E_{1B})$ are changed. When the voltages $E_{2R}$, $E_{2G}$ and $E_{2B}$ at the terminals 171, 172 and 173 are increased, voltages applied to the cathodes 111, 112 and 113 of the color display tube 100 are also increased. On the other hand, when the voltages $E_{2R}$, $E_{2G}$ and $E_{2B}$ are lowered, the voltages of the cathodes 111, 112 and 113 become lower, which results in that the potential differences between the cathodes 111, 112 and 113 and a grid $G_1$ are decreased. Consequently, the quantity or amount of the electron beams emitted by the cathodes 111, 112 and 113 and passing through the grid $G_1$ is increased. When the voltages of the cathodes 111, 112 and 113 become higher, the amount of the electron beams passing through the grid $G_1$ is decreased. If the voltages of the cathodes 111, 112 and 113 are further increased, the electron beams are inhibited from passing through the grid $G_1$ and thus are cut off by the grid $G_1$. Usually, the voltages $E_{2R}$, $E_{2G}$ and $E_{2B}$ of the terminals 171, 172 and 173 are so selected that they are very close to the voltages at which the electron beams emitted from the cathodes 111, 112 and 113 are cut off by the grid $G_1$ and that the correct white balance can be obtained. When the video signals are supplied to the input terminals 184, 185 and 186 of the drive circuit 180, the transistors 181, 182 and 183 are turned on (i.e. changed over to the conducting state), whereby the voltages at the output terminals 177, 178 and 179 of the drive circuit 180 are lowered, which results in that the voltages. $E_{1R}$, $E_{1G}$ and $E_{1B}$ at the terminals 174, 175 and 176 of the cut-off voltage control or regulating circuits 140, 150 and 160 are lowered. Thus, the voltages $E_{1R}$, $E_{2G}$ and $E_{2B}$ at the terminals 171, 172 and 173 are lowered, to thereby cause the voltages of the cathodes 111, 112 and 113 of the color display tube 100 to be lowered. The electron beams emitted from the cathodes 111, 112 and 113 can pass through the grid $G_1$, whereby a raster is produced on the face plate 120 of the color display tube 100. By the way, the video signal applied to the terminal 174 of the cut-off voltage control circuit 140 is supplied to the terminal 171 through the capacitor 144.

The cut-off voltage control or regulating circuits 141, 142 and 143 shown in FIG. 1 can change the amount of the electron beams emitted by the cathodes 111, 112 and 113 of the color display tube 100 without undergoing any appreciable influence of the operation of the drive circuit 180 or exerting any appreciable influence to the operation or function of the drive circuit 180. Accordingly, by selecting the voltages at the terminals 171, 172 and 173 of the cut-off voltage control circuits 140, 150 and 160 at appropriate values and varying the latter, only the brightness will be changed without bringing about any change in the color tone or chromacity of the raster. For this reason, it is possible to constitute the brightness control circuit with the aid of the cut-off voltage control circuits 140, 150 and 160.

Usually, the brightness control means of the color display apparatus is mounted on a housing thereof (not shown), while the drive circuit 180 is disposed at a location distanced from the color display tube 100. By way of example, assuming that the resistor 141 is disposed on the housing of the color display apparatus, e.g. on a front panel of the housing, the length of each of lines 145 and 146 which serve to connect the resistor 141 to the terminals 171 and 174 will amount to about 30 cm. As the consequence, stray capacity will be produced between the common potential (ground potential) and the lines 145 and 146. In particular, when shielding wires are used for the lines 145 and 146 with a view to preventing the spurious emission from the lines 145 and 146, the stray capacity will amount to 50 pF or more. In case the variable resistor 141 is disposed on a same base plate or substrate as the cut-off voltage control or regulating circuit 140 in the apparatus shown in FIG. 1 to thereby allow the lines 145 and 146 to be extremely short, the stray capacity produced by the color display tube 100, and the cut-off voltage control or regulating circuit 140 is only about 5 pF. Accordingly, if the lines 145 and 146 providing the stray capacity of about 50 pF are connected to the cut-off voltage regulating circuits 140, 150 and 160, the frequency pass-band of the circuit will be narrowed to about one-tenth. In this connection, it is noted that the circuit exhibiting the frequency pass-band beyond 50 MHz is demand in the modern color display apparatus. The circuit of the narrow frequency pass-band tends to be no more used.

SUMMARY OF THE INVENTION

An object of the present invention is to provide a brightness control circuit with an arrangement in which stray capacity produced due to the wiring of leads or lines of a brightness controlling (adjusting) variable resistor of a brightness control circuit for a color display apparatus brings about little attenuation of video signal even when the variable resistor is mounted on a front panel or the like of the color display apparatus.

Another object of the present invention is to provide a brightness control circuit with a composition in which a color display tube drive circuit and the brightness control circuit can be designed independent of each other, wherein influence of one circuit exerted on the other circuit upon control or adjustment performed by the former is severely limited.

According to an aspect of the present invention, voltage regulating or adjusting means for varying voltages between respective input terminals and output terminals thereof in dependence on externally supplied voltage control or regulating signals are provided between cathodes of a color display tube corresponding to primary color signals and an output end of the color display tube drive circuit for supplying drive currents to the individual cathodes of the color display tube. There is further provided control signal generating means connected to the voltage regulating means for supplying the voltage regulating or adjusting signals to the voltage regulating means.

The voltage control signal generating means include two adjusting or regulating means, i.e. first regulating means for changing simultaneously all the voltage control signals supplied to the voltage regulating means corresponding to the primary color signals and second regulating means for varying individually the voltage control signals for each of the color signals.

It is further contemplated that adjustment or control of cut-off voltage of the color display tube and adjustment of the white balance in the state of high brightness are performed by the second regulating means for varying individually the voltage control signals on the color signal basis while the birghtness of raster scanned on the face plate is adjusted with the aid of the first regulating means.

DESCRIPTION OF THE PREFERRED EMBODIMENTS

As mentioned hereinbefore, the present invention concerns an improvement on or relating to a brightness control circuit of a color display apparatus incorporating a color display tube.

Figure 2:
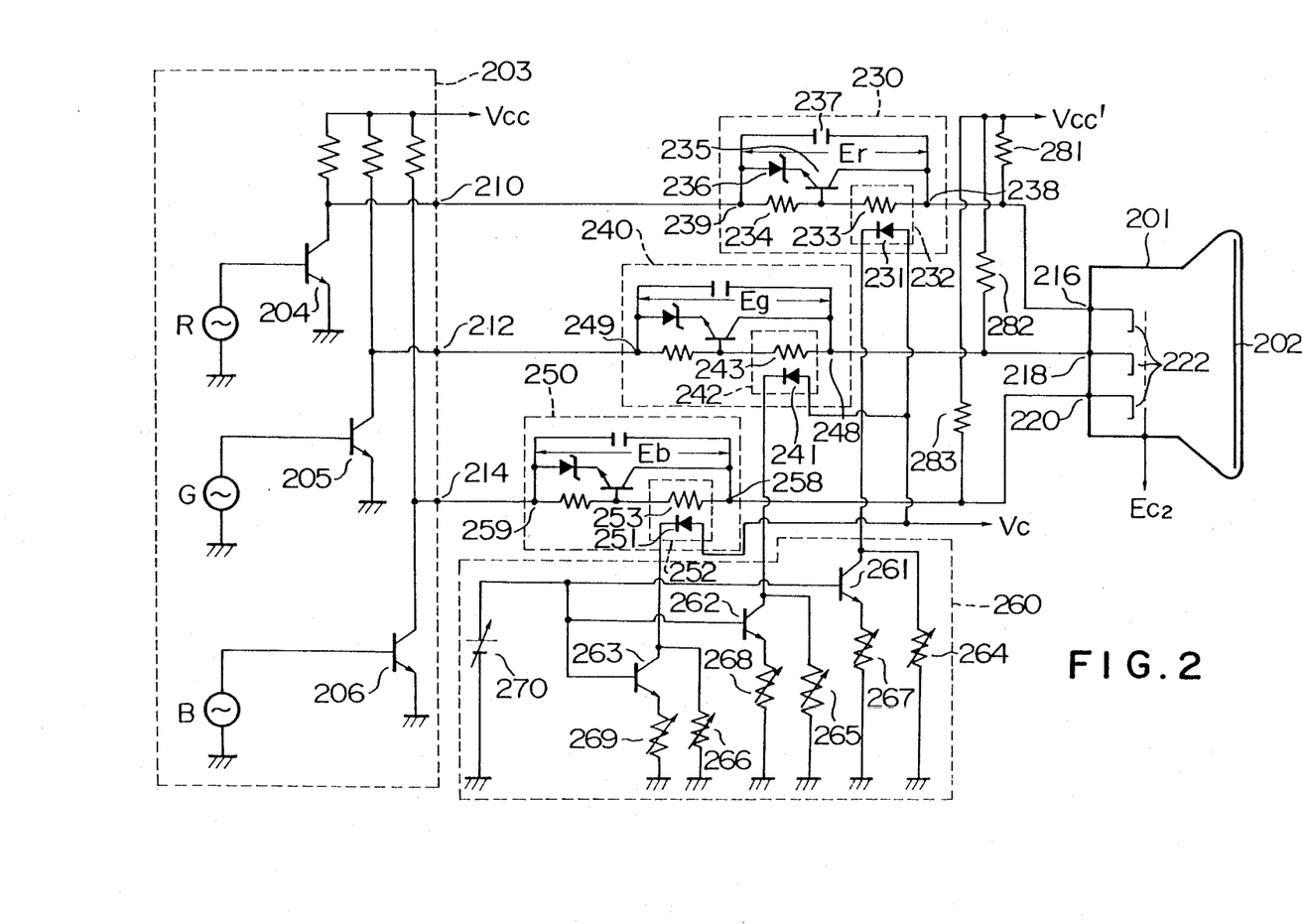
FIG. 2 is a circuit diagram of a brightness control circuit according to a first embodiment of the invention.

FIG. 2 shows a brightness control circuit according to a first embodiment of the invention.

Referring to the figure, the brightness control circuit is composed of voltage regulating or adjusting circuits 230, 240 and 250 provided between cathode terminals 216, 218 and 220 of a color display tube 201 and a color display tube drive circuit 203 destined for supplying drive currents to the cathode terminals 216, 218 and 220 of the color display tube 201, and a brightness control power supply circuit 260 for supplying a current or currents for regulating input-output terminal voltages $E_r$, $E_g$ and $E_b$ (i.e. voltage between the input terminal and the output terminal) of the voltage regulating circuits 230, 240 and 250.

The cathode terminals 216, 218 and 220 of the color display tube 201 are connected to the output terminals 238, 248 and 258 of the voltage regulating circuits 230, 240 and 250, respectively.

The input terminals 239, 249 and 259 of the voltage regulating circuit 230, 240 and 250 are, respectively, connected to collector output terminals 210, 212 and 214 of the color display tube drive circuit 203.

The color display drive circuit 203 include driving transistors 204, 205 and 206 having base terminals to which the primary color signals constituting the video signals are applied, respectively.

The color or video signals are superposed with a DC voltage by the voltage regulating or adjusting circuits 230, 240 and 250, respectively, and subsequently applied to the cathode terminals 216, 218 and 220 of the color display tube 201.

The amount of the electron beams emitted by the cathode 222 of the color display tube 201 and impinging on a face plate 202 is varied in dependence on the video signals, whereby a picture is reconstituted on the face place 202.

Next, detailed description will be made on the voltage regulating circuits 230, 240 and 250 and the brightness control power supply circuit 260 which are main components of the brightness control circuit according to the invention.

First, the voltage regulating or adjusting circuit 230 will be described. It should be noted that the other voltage regulating circuits 240 and 250 are realized in a same configuration as the voltage regulating circuit 230.

The voltage regulating circuit 230 is composed of a transistor 235, a constant-voltage diode (avalanche) 236, a resistor 234, a variable resistor element 232 constituted by a photocoupler typified by a CdS-photocoupler (i.e. the photocoupler made of cadmium sulfide), and a capacitor 237.

The photocoupler 232 is constituted partly by a light emitting element 231 and partly by a light receiving element 233.

The resistor 234 is connected in series to the light receiving element 233 to constitute a voltage dividing circuit. The transistor 235 has a base connected to a junction between the resistor 234 and the light receiving element 233. The collector of the transistor 235 is connected to an output terminal 238. The constant-voltage diode 236 is connected between the emitter of the transistor 235 and the input terminal 239. The capacitor 237 is connected between the input terminal 239 and the output terminal 238 and serves as the bypass capacitor for the video signal applied to the base of the driving transistor 204.

The circuit mentioned above functions as a constant-voltage circuit for maintaining the voltage $E_r$ between the input terminal 239 and the output terminal 238 (this voltage is also referred to as the input-output terminal voltage) at a constant level in dependence on the current fed to the light emitting element 231.

Next, elucidation will be made as to how the input-output terminal voltage $E_r$ is maintained constant in dependence on the current supplied to the light emitting element 231 of the photocoupler 232.

Assuming that the resistance values of the resistor 234 and the light receiving element 233 are represented by $R_1$ and $R_2$, respectively, the input-output terminal voltage $E_r$ is determined in accordance with the following expression:

$$E_r = \frac{R_1 + R_2}{R_1}(E_D + V_{BE})$$

where $E_D$ represents Zener voltage of the constant-voltage diode and $V_{BE}$ represents a base-limiter voltage of the transistor 235. It should be mentioned that the above expression is an approximating expression which applies valid when the value of the resistor 281 is sufficiently large.

As will be seen, the input-output terminal voltage $E_r$ is maintained at a level determined by the resistance ratio between the resistor 234 and the light receiving element 233. In this connection, it is noted that the resistance value of the light receiving element 233 can be varied in dependence on the current supplied to the light emitting element 231. Accordingly, the inputoutput terminal voltage $E_r$ of the voltage regulating circuit 230 can be set to a constant level in dependence on the current supplied to the light emitting element 231 of the photocoupler 232.

In this manner, it is possible to change the brightness of the color display tube 201 when the voltages applied to the cathodes 216, 218 and 220 are changed by correspondingly changing or varying the input-output terminal voltages $E_r$, $E_g$ and $E_b$ of the voltage regulating circuits 230, 240 and 250.

Next, description will be made on the characteristics of the CdS-photocouplers employed in the voltage regulating circuit 230, 240 and 250 of the brightness control circuit according to the instant embodiment.

Figure 3:
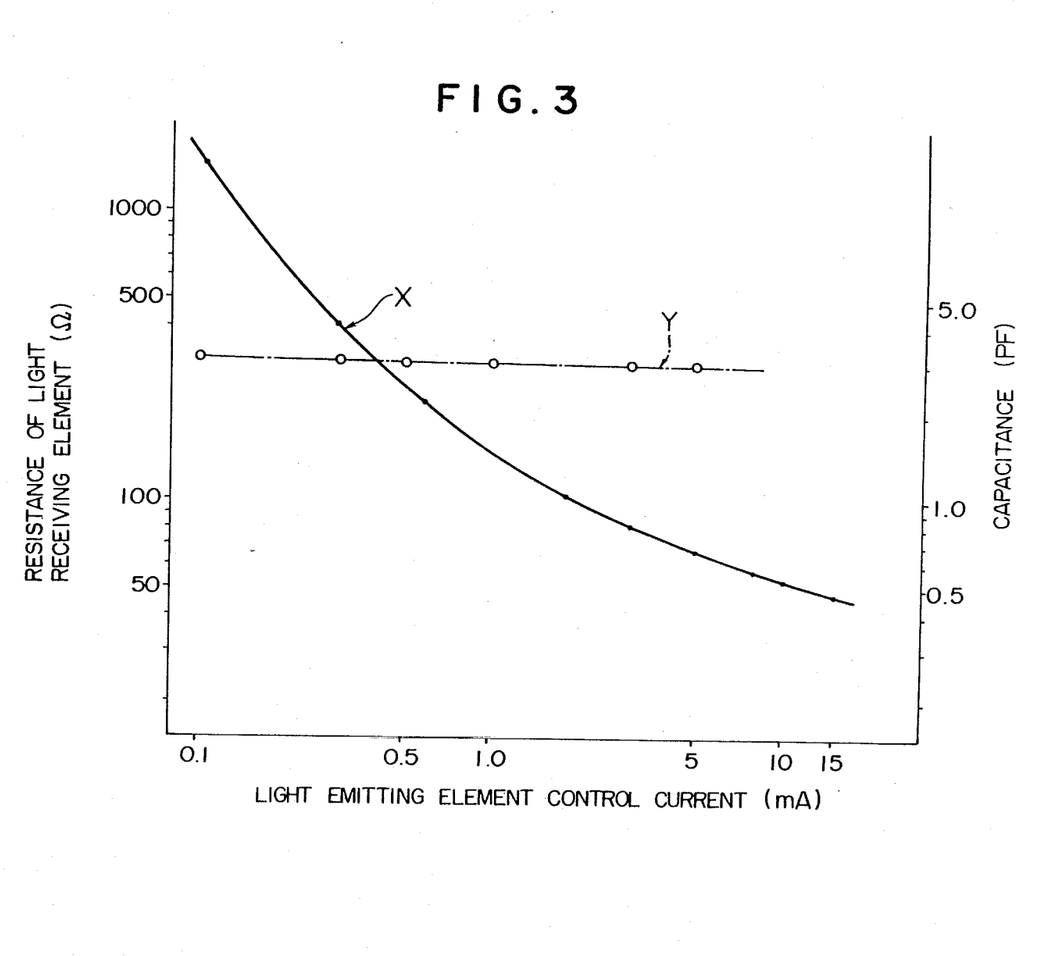
FIG. 3 is a view for graphically illustrating coupling capacity characteristics between a light emitting element and a light receiving element which constitute a CdS-photocoupler.

FIG. 3 graphically illustrates the characteristic of coupling capacity present between the light emitting 231 and the light receiving element 233 of the CdS-photocoupler.

In FIG. 3, a curve X represents variation in the resistance value of the light receiving element 233 as a function of the current fed to the light emitting element 231. On the other hand, a curve Y represents variation in the coupling capacity between the light emitting element 231 and the light receiving element 233 as a function of the current flowing through the light element 231.

As will be seen from the above graphical representation, the coupling capacity present between the light emitting lement 231 and the light receiving element 231 is of an extremely low value on the order of 3 pF substantially independent of the current supplied to the light emitting element 231.

For this reason, attenuation of the video signals due to the coupling capacities between the light emitting elements 231, 241 and 245 and the light receiving elements 233, 234 and 253 can be reduced to a negligible degree even in the wide-band display apparatus in which the video signals of high frequency are applied to the voltage regulating circuits 230, 240 and 250.

Now, the brightness control power supply circuit 260 will be described.

This circuit 260 is composed of transistors 261, 262 and 263, variable resistors 264, 265, 267, 268 and 269, and a variable voltage source 270.

The transistors 261, 262 and 263 have respective collector terminals connected to the light emitting elements 231, 241 and 251 of the voltage regulating circuits 231, 240 and 250, respectively. The variable resistors 264, 265 and 266 are connected between the ground or earth potential and the collectors of the transistors 261, 262 and 263, respectively. The variable resistors 267, 268 and 269 are connected between the ground or earth potential and the emitters of the transistors 261, 262 and 263, respectively.

The variable voltage source 270 is connected to the base terminals of the transistors 261, 262 and 263.

The variable resistors 264, 265 and 266 serve to regulate or adjust the cut-off voltage. On the other hand, the variable resistors 267, 268 and 269 are used for adjusting the white balance on the bright screen.

By regulating the voltage of the variable voltage source 270, it is possible to vary the currents supplied to the light emitting elements 231, 241 and 251 of the photocouplers 232, 234 and 235 by way of the transistors 261, 262 and 263. When the currents supplied to the light emitting elements 231, 241 and 251 are vaired, the inputoutput terminal voltage $E_r$, $E_g$ and $E_b$ of the voltage regulating circuits 230, 240 and 250 are correspondingly varied, which results in that the voltage applied to the cathode terminals 216, 218 and 220 of the color display tube are varied. Consequently, the amount of the electron beams impinging on the face plate 202 is varied, whereby the brightness of the color display tube 201 is varied.

In this way, the brightness of the color display tube 201 can be controlled by regulating the voltage of the variable voltage source 270.

It should be mentioned that the ratios of changes in the currents fed to the light emitting elements 231, 241 and 251 of the photocouplers 232, 242 and 252 relative to the change in the voltage of the variable voltage source 270 can be separately and individually set for each of the light emitting elements 231, 241 and 251 through the adjustments of the variable resistors 264, 265, 266, 267, 268 and 269. In other words, the ratio of change in brightness can be set for each of the three primaries R, G and B, which means that the regulation of the cut-off voltage and the adjustment of the white balance on the bright screen can be performed in a much facilitated manner.

Figure 4:
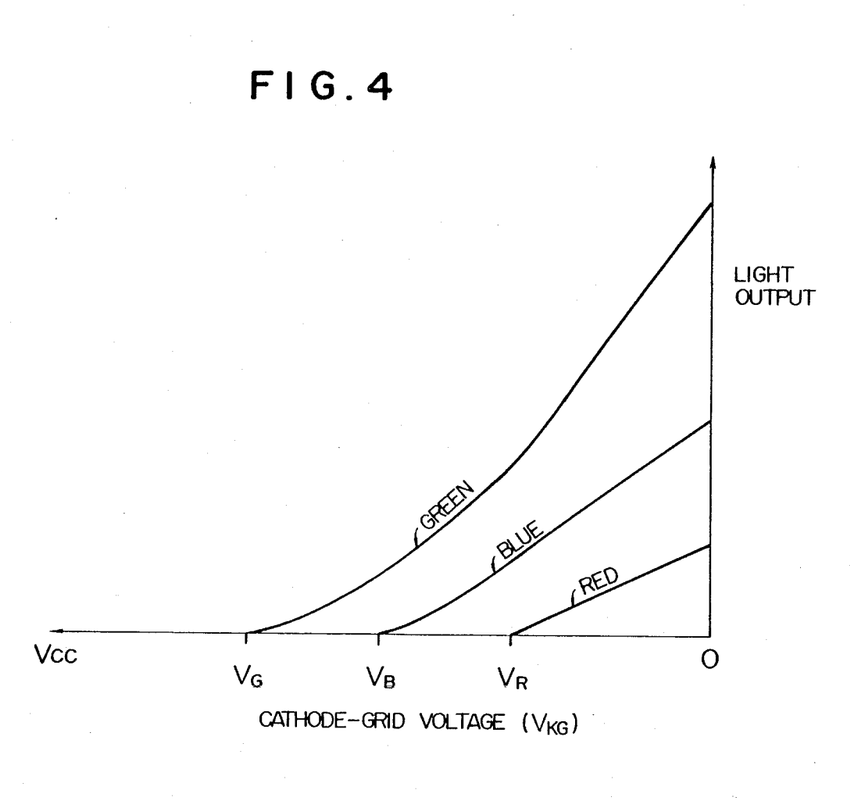
FIG. 4 is a view for graphically illustrating relationships between voltages appearing across cathode controlling grid of a cathode-ray tube and magnitude of light outputs produced on a face plate of the tube.

FIG. 4 graphically illustrates relationships between the cathode-grid voltage $V_{KG}$ of the color display tube 201 and the light outputs on the face plate 202.

The regulation of the cut-off voltage means the adjustment of the white balance at the time when the light output on the face plate 202 is very close to zero. In other words, voltages $V_G$, $V_B$ and $V_R$ at which the light outputs of the different primaries intersect the abscissa shown in FIG. 4 are so regulated that the white balance can be obtained.

On the other hand, in the case of the adjustment of the white balance at the time when the brightness is high, the slopes of the curves representative of the light outputs of the individual primary colors as shown in FIG. 4 are adjusted so that the white balance can be maintained.

Next, the regulation of the cut-off voltage in the instant embodiment will be described.

The output voltage of the variable voltage source 270 is decreased until the transistors 261, 262 and 263 are cut off.

At that time, the transistors 261, 262 and 263 are in the non-conducting or OFF-state. Accordingly, magnitude of the currents supplied to the light emitting elements 231, 241 and 251 of the photocouplers 232, 242 and 252 is determined by the resistance values of the variable resistors 264, 265 and 266.

Subsequently, the resistance values of the variable resistors 264, 265 and 266 are decreased until the brightness on the face plate 202 is reduced approximately to zero. In this state, the variable resistors 264, 265 and 266 are adjusted to attain the optimum white balance and fixed to the respective instant values.

Next, the adjustment of the white balance on the bright screen will be elucidated.

The white balance on the bright screen can be realized through such regulation that the input-output terminal voltages $E_r$, $E_g$ and $E_b$ of the voltage regulating circuits 230, 240 and 250 are varied at respective predetermined rates of change when the output voltage of the variable voltage source 270 is varied.

To this end, the variable resistors 267, 268 and 269 are provided in the instant embodiment. Through adjustment of the variable resistors 267, 268 and 269, unevenness or non-uniformity in the characteristics of the individual circuit can be compensated for.

More specifically, even when a same voltage is applied to the base terminals of the transistors 261, 262 and 263 from the variable voltage source 270, the collector currents of these transistors 261, 262 and 263 can be individually set independent of one another in accordance with the values of the variable resistors 267, 268 and 269. Accordingly, changes or variations in the collector currents of the transistors 261, 262 and 263 as brought about by varying the output voltage of the variable voltage source 270 will assume different values in correspondence to the resistance values of the variable resistors 267, 268 and 269. Since the input-output terminal voltages of the voltage regulating circuits 230, 240 and 250 depend on the collector currents of the transistors 261, 262 and 263, the brightness for the individual primary colors on the face plate 202 can be varied through adjustment of the variable 267, 268 and 269 so that the optimum white balance can be attained.

Figure 5:
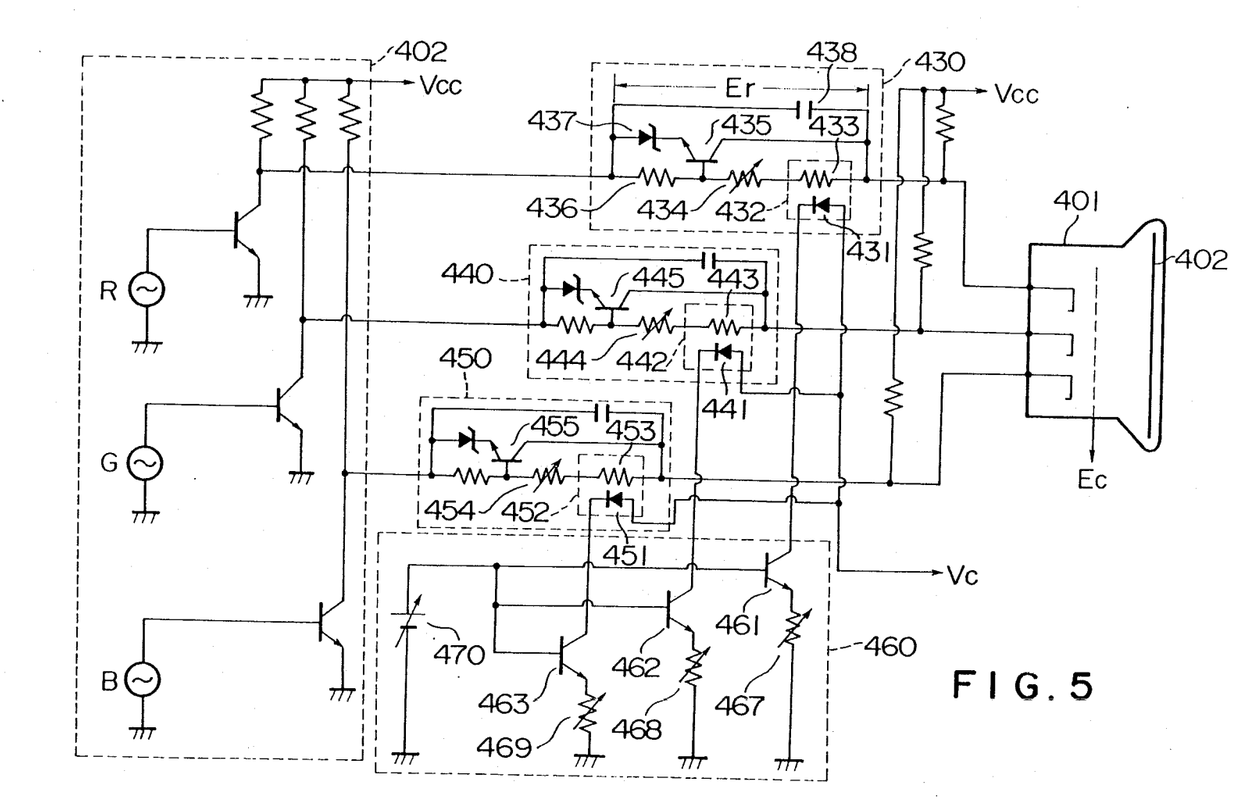
FIG. 5 is a circuit diagram of a brightness control circuit according to a second embodiment of the invention.

FIG. 5 shows a second exemplary embodiment of the present invention.

In the case of this embodiment, the cut-off voltage regulating means (246, 247, 248) which is incorporated in the brightness control power supply circuit 260 in the case of the first embodiment described above are provided in the voltage regulating circuits 430, 440 and 450, respectively.

The color display drive circuit 402 is of the same structure and serves for the same operation as the color display drive circuit 203 of the first embodiment. Accordingly, any further description will be unnecessary.

The voltage regulating circuit 430 is composed of a photocoupler 432, a variable resistor 434, a resistor 436, a transitor 435, a constant-voltage diode 437 and a capacitor 438.

Since the voltage regulating circuits 440 and 450 are of a similar configuration, description will be limited to the voltage regulating circuit 430.

The resistor 436, the variable resistor 434 and the light receiving element 433 of the photocoupler 432 are connected in series to constitute a voltage division circuit. The transistor 435 has a base connected to a junction between the variable resistor 434 and the fixed resistor 436.

Connections of the other circuit components are similar to those of the voltage regulating circuit 230 of the first embodiment.

The input-output terminal voltage $E_r$ of the voltage regulating circuit 430 is determined on the basis of the ratio between the value of the resistor 436 and the combined value of the variable resistor 434 and the light receiving element 433.

Next, adjustment of the cut-off voltage will be elucidated.

The output voltage of the variable voltage source 470 is lowered to cut off the transistors 461, 462 and 463.

Then, the currents flowing to the light emitting elements 431, 441 and 451 of the photocouplers 432, 442 and 452 become zeor.

In the state in which the currents supplied to the light emitting elements 431, 441 and 451 are zero, the resistances of the light emitting elements 433, 443 and 453 are set to the initial values in accordance with the characteristics thereof.

Subsequently, the values of the variable resistors 434, 444 and 454 are decreased until the brightness on the face plate 402 is extremely low. In this state, the variable resistors 434, 444 and 454 are fixed to the values at which the white balance can be attained. In this way, the regulation or adjustment of the cut-off voltage is performed.

The brightness control power supply source circuit 460 differs from that of the first embodiment in that the variable resistors 264, 265 and 266 are removed. The regulation or control for attaining the white balance on the bright screen can be effected through the adjustment of the variable resistors 467, 468 and 469 in the similar manner as in the case of the first embodiment.

As will be appreciated from the foregoing, reduction in the video signal pass-band due to the stray capacity can be prevented according to the teaching of the present invention.

More specifically, the invention teaches that the brightness control performed by varying the input-output terminal voltage of the voltage regulating circuits 230, 240 and 250 is accomplished by indirectly varying the resistance values of the light receiving elements 233, 243 and 253 of the photocouplers 232, 242 and 252 by correspondingly varying the currents supplied to the light emitting elements 231, 241 and 251.

Since the coupling capacities present between the light emitting elements and the light receiving elements of the photocouplers 232, 242 and 252 are extremely small, there arises no possibility of the stray capacity of the circuit incorporating the light receiving elements 233, 234 and 235 being increased regardless of the location where the circuit including the light emitting elements 231, 241 and 251 is disposed.

Thus, the video signal conducted through the voltage regulating circuits 230, 240 and 250 is satisfactorily protected from attenuation due to the stray capacity.

Further, by virtue of such arrangement that the circuit for performing the brightness control is provided independent of the color display tube drive circuit 203, influence to one circuit from the other or vice versa can be prevented.

We claim:

1. A brightness control circuit for use in a display apparatus including a color display tube having first, second and third cathodes supplied with video signals corresponding to red, green and blue colors, and first, second and third color display tube drive circuits for supplying drive signals corresponding to said video signals to said first, second and third cathodes; comprising:

first voltage regulating means including a first photocoupler having a first photodetector provided between said first color display tube drive circuit and the first cathode of said color display tube for adjusting a DC voltage between the output end of said first color display tube drive circuit and said first cathode in response to a first externally applied voltage regulating signal supplied through said first photocoupler;

second voltage regulating means including a second photocoupler having a second photodetector provided between said second color display tube drive circuit and the second cathode of said color display tube for adjusting a DC voltage between the output end of said color display tube drive circuit and said second cathode in response to a second externally applied voltage regulating signal supplied through said second photocoupler;

third voltage regulating means including a third photocoupler having a third photodetector provided between said third color display tube drive circuit and the third cathode of said color display tube for adjusting a DC voltage between the output end of said third color display tube drive circuit and said third cathode in response to a third externally applied voltage regulating signal supplied through said third photocoupler; and regulating signal generating means for generating said first, second and third voltage regulating signals to be supplied to said first, second and third voltage regulating means.

2. A brightness control circuit according to claim 1, wherein each of said first, second and third voltage regulating means comprises: a constant-voltage circuit which includes a voltage division circuit constituted by a plurality of serially connected resistors at least one of which is the photodetector of the respective photocoupler controlled by said first, second or third voltage regulating signal, and a transistor having a base connected to a junction between said resistors and a collector connected to one end of said voltage division circuit, and a constant-voltage diode disposed between emitter of said transistor and the other end of said voltage division circuit.

3. A brightness control circuit according to claim 2, wherein said one end of said voltage division circuit is coupled to said other end of said voltage division circuit through a capacitor.

4. A brightness control circuit according to claim 1 or 2, wherein each of said first, second and third photocouplers is constituted by a CdS (cadmium sulfide) photocoupler.

5. A brightness control circuit according to claim 3, wherein each of said first, second and third photocouplers is constituted by a CdS (cadmium sulfide) photocoupler.

6. A brightness control circuit according to claim 2, wherein said regulating signal generating means includes first regulating means for adjusting said first, second and third voltage regulating signals independent of one another, and second regulating means for adjusting said first, second and third voltage regulating signals simultaneously.

7. A brightness control circuit according to claim 3, wherein said regulating signal generating means includes first regulating means for adjusting said first, second and third voltage regulating signals independent of one another, and second regulating means for adjusting said first, second and third voltage regulating signals simultaneously.

8. A brightness control circuit according to claim 4, wherein said regulating signal generating means includes first regulating means for adjusting said first, second and third voltage regulating signals independent of one another, and second regulating means for adjusting said first, second and third voltage regulating signals simultaneously.

9. A brightness control circuit according to claim 5, wherein said regulating signal generating means includes first regulating means for adjusting said first, second and third voltage regulating signals independent of one another, and second regulating means for adjusting said first, second and third voltage regulating signals simultaneously.

10. A brightness control circuit according to claim 2, wherein said regulating signal generating means includes: first, second and third transistors having collectors connected to one ends of light emitting elements of said photocouplers of said first, second and third voltage regulating means, respectively; a variable voltage source connected in common to the bases of said first, second and third transistors; first, second and third variable resistors connected, respectively, between the emitters of said first, second and third transistors and the ground potential; and a current source connected to the other ends of said light emitting elements, respectively, to supply a current to said elements.

11. A brightness control circuit according to claim 3, wherein said regulating signal generating means includes: first, second and third transistors having collectors connected to one ends of light emitting elements of said photocouplers of said first, second and third voltage regulating means, respectively; a variable voltage source connected in common to the bases of said first, second and third transistors; first, second and third variable resistors connected, respectively, between the emitters of said first, second and third transistors and the ground potential; and a current source connected to the other ends of said light emitting elements, respectively, to supply a current to said elements.

12. A brightness control circuit according to claim 4, wherein said regulating signal generating means includes: first, second and third transistors having collectors connected to one ends of light emitting elements of said photocouplers of said first, second and third voltage regulating means, respectively; a variable voltage source connected in common to the bases of said first, second and third transistors; first, second and third variable resistors connected, respectively, between the emitters of said first, second and third transistors and the ground potential; and a current source connected to the other ends of said light emitting elements, respectively, to supply a current to said elements.

13. A brightness control circuit according to claim 5, wherein said regulating signal generating means includes: first, second and third transistors having collectors connected to one ends of light emitting elements of said photocouplers of said first, second and third voltage regulating means, respectively; a variable voltage source connected in common to the bases of said first, second and third transistors; first, second and third variable resistors connected, respectively, between the emitters of said first, second and third transistors and the ground potential; and a current source connected to the other ends of said light emitting elements, respectively, to supply a current to said elements.

14. A brightness control circuit according to claim 10, wherein said regulating signal generating means further includes: fourth, fifth and sixth variable resistance elements disposed, respectively, between the collectors of said first, second and third transistors and the ground potential for adjusting cut-off voltage of said color display tube.

15. A brightness control circuit according to claim 11, wherein said regulating signal generating means further includes: fourth, fifth and sixth variable resistance elements disposed, respectively, between the collectors of said first, second and third transistors and the ground potential for adjusting cutoff voltage of said color display tube.

16. A brightness control circuit according to claim 12, wherein said regulating signal generating means further includes: fourth, fifth and sixth variable resistance elements disposed, respectively, between the collectors of said first, second and third transistors and the ground potential for adjusting cut-off voltage of said color display tube.

17. A brightness control circuit according to claim 13, wherein said regulating signal generating means further includes: fourth, fifth and sixth variable resistance elements disposed, respectively, between the collectors of said first, second and third transistors and the ground potential for adjusting cut-off voltage of said color display tube.

* * * * *